Patented July 5, 1927.

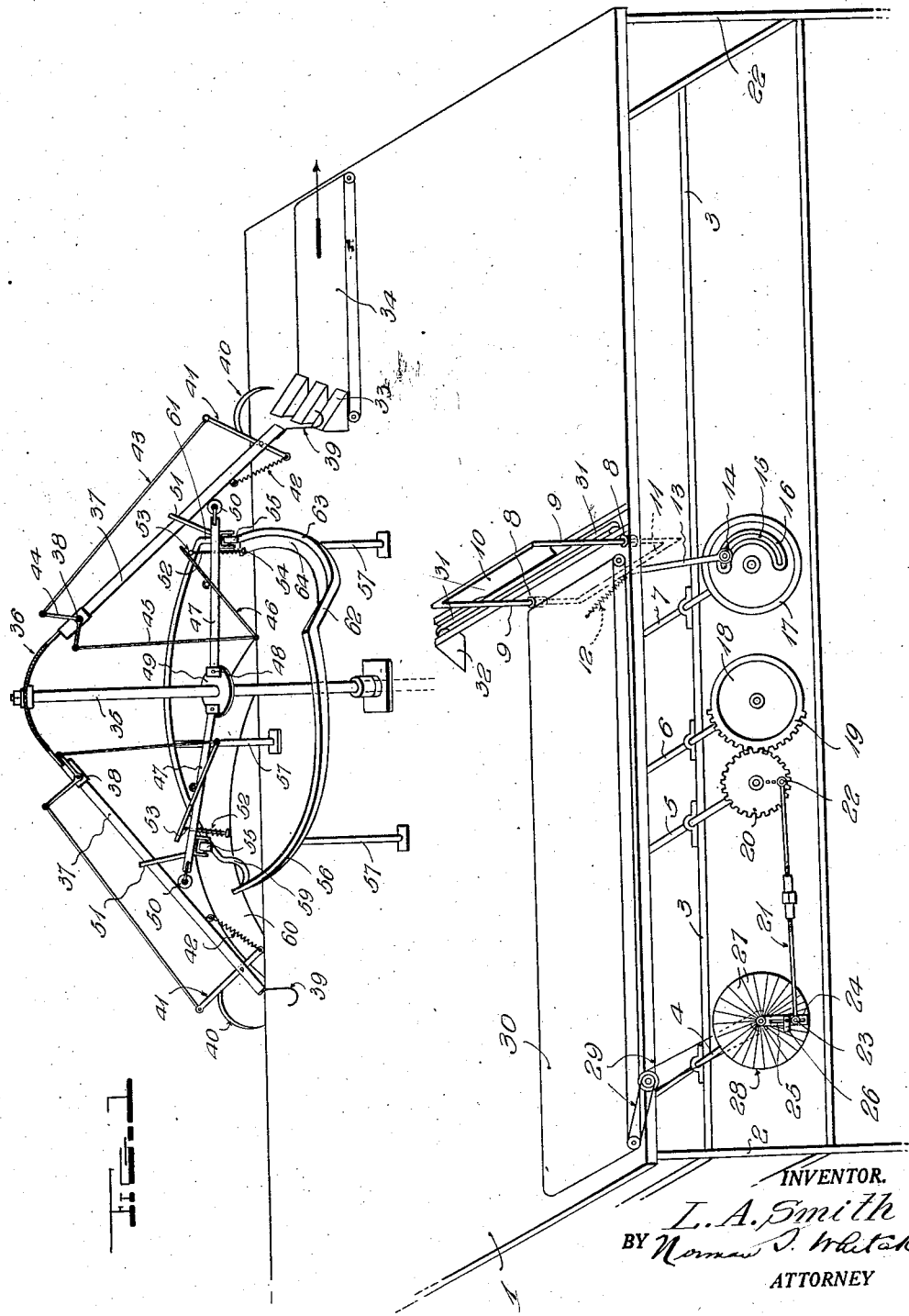

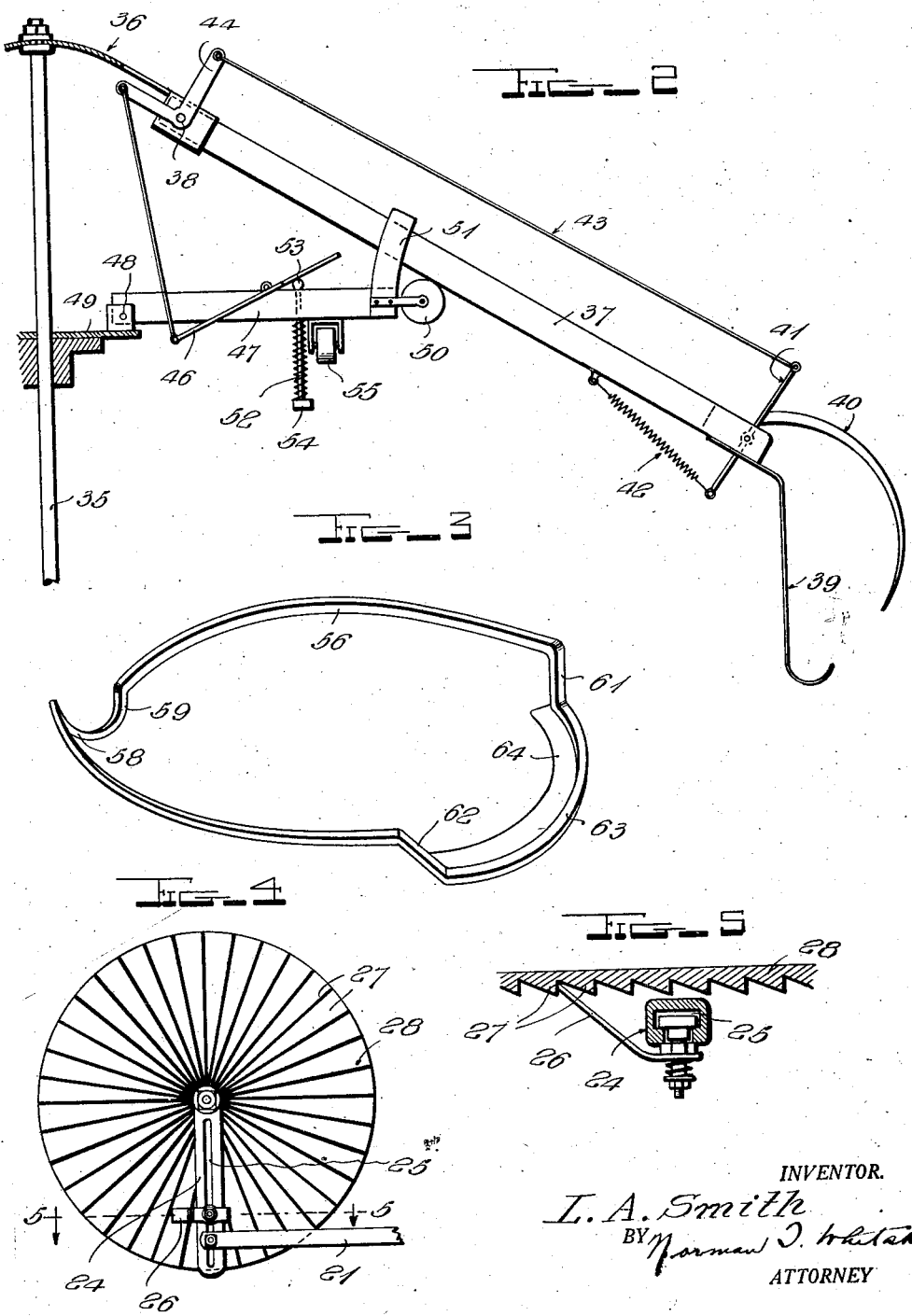

1,635,015

UNITED STATES PATENT OFFICE.

LOUIS A. SMITH, OF AUBURN, NEW YORK.

CONFECTION-COATING MACHINE.

Application filed February 10, 1925. Serial No. 8,264.

My invention relates to improvements in machines used in the manufacture of confections, and the present form of such invention is designed for producing what are known as ice cream pies, that is a slice or block of ice cream and a coating of chocolate or other edible substance around the same.

The principal object of the invention is to produce a simple and easily operable machine which will rapidly cut slices from a large block or bar of ice cream, will dip the cut slices of cream into the coating fluid and will then discharge the coated slices.

Further objects are to provide simple yet efficient means for holding and carrying the bodies to be coated, and to produce novel means for operating the holding and carrying means to first dip each body into the coating fluid, to then raise it from the fluid and to finally discharge the coated body.

Still further aims are to provide a unique form of cutter for slicing the ice cream bar, and to provide novel means for advancing the bar to the cutter after each slice is cut.

With the foregoing and minor objects in view, the invention resides in the novel subject matter hereinafter described and claimed, and shown in the accompanying drawings.

Figure 1 of the drawings is a diagrammatic perspective view of a machine embodying my invention.

Figure 2 is an enlarged vertical sectional view through part of the rotary structure for grasping the cut slices, dipping them and discharging the dipped slices.

Figure 3 is a perspective view of the cam trackage which controls the grasping, dipping and releasing operations of the above mentioned rotary structure.

Figure 4 is a side elevation of the adjustable ratchet mechanism which is instrumental in advancing the ice cream bar to the cutter.

Figure 5 is a horizontal sectional view on line 5—5 of Figure 4.

The drawings above briefly described may be considered as illustrative of one of the preferred forms of construction, but the scope of the invention is such that machines of other structures usable for dipping numerous kinds of articles, may be provided within such scope. It is therefore to be understood at the outset that I am not restricted to the construction shown.

The numeral 1 on the drawing designates a suitable table supported by legs 2, and under this table are suitable horizontal bars 3 to which bearings are secured for four parallel shafts 4, 5, 6 and 7. Over the shaft 7, the table 1 is provided with vertical tubular guides 8 through which vertical bars 9 slide, the upper ends of said bars carrying a horizontal cutter 10, while their lower ends are connected by a horizontal bar 11 to which a spring 12 may be connected to normally raise the three bars 9 and 11 and the cutter 10. Pivoted to and extending downwardly from the bar 11, is a pitman 13 whose lower end carries a wrist pin or other shoe 14 which is both pivotally and slidably received in an arcuate guide slot 15 of a curve track 16, the latter being suitably carried by a wheel 17 which rotates with the shaft 7.

The shaft 6 is driven by 7 through suitable connections (not shown) and these two shafts preferably turn at the same speed. On shaft 6, a relatively large multilated gear 18 is secured, said gear having teeth 19 throughout slightly less than half its circumference. These teeth are adapted, at intervals, to mesh with and drive a smaller gear 20 on the shaft 5, the latter being normally idle. A pitman 21 is connected by a wrist pin 22 to the gear 20, and by means of a shoulder bolt or the like 23, said pitman is connected also to an oscillatory arm 24 which is loosely hung from the shaft 4, said arm having a slot 25 along which the bolt is adjustable.

The arm 24 carries a suitable spring-pressed dog 26 for engagement at any desired point with radial ratchet ribs 27 on a wheel 28 which is secured to the shaft 4. By means of belts 29, this shaft 4 drives an endless feed conveyor 30 suitably mounted on the table 1 for advancing a bar of ice cream to the cutter 10. The gears 18 and 20, pitman 21, ratchet mechanism and belts 29 effect an intermittent advancement of the conveyor 30 to successively project the ice cream bar under the cutter 10, and by the time such advancement has taken place, one end of the track 16 pulls downwardly on the pitman 13 and operates said cutter to cut a slice from the ice cream bar. As soon as this occurs the wrist pin 14 has passed lower dead center and the spring 12 acts to return the cutter and pitman to raised position, said wrist pin then sliding idly in the slot 15.

The slices cut from the ice cream bar are received onto a transverse conveyor 31 and are delivered thereby to a receiving slide 32, from which they are caught by a rotary structure now to be described, which structure dips the slices into a coating fluid and later releases the coated slices onto a receiving slide 33, down which they slide to a discharge conveyor 34, which may if desired conduct them to a refrigerating chamber.

The rotary structure above referred to, includes a vertical shaft 35 passing through a bearing in the table 1 and driven in any desired manner, for instance by an electric motor (not shown). This shaft is geared to the shaft 7 in any desired way so that the movements thereof are permanently synchronized.

The upper end of the shaft 35 carries a crown 36 to which any desired number of radial, inclined arms 37 are pivoted at 38, solely for vertical movement. The outer ends of these carry hooks or jaws 39 which are rigid with respect thereto, and over these jaws, movable jaws or grab hooks 40 are provided, said movable jaws being carried by levers 41 fulcrumed between their ends to the arms 37. Springs 42 connect to the lower ends of the levers 41 and are active to close the movable jaws 40, when such closing is permitted. Links 43 connect the upper ends of the levers 41 with bell crank levers 44 at the upper ends of the arms 37, preferably fulcrumed on the pivots 38, and other links 45 connect the levers 44 with inclined levers 46 which are fulcrumed between their ends to lower arms 47. The arms 47 are pivoted at 48 to a collar or the like 49 on the shaft 35 and the outer ends of these arms carry rollers 50 on which the arms 37 rest, the latter being held against lateral movement from the rollers, by guides 51 rising from the arms 47. These last named arms also carry vertical, spring-lowered plungers 52 which form control members for the links and levers above described for operating the movable jaws, the upper ends of said plungers loosely contacting with the arms 46, as at 53, while the lower ends of said plungers are provided with shoes 54, for a purpose to appear below.

The arms 47 are provided with transverse rollers 55 which rest constantly on an annular cam track 56 which is concentric with the shaft 35 and is supported by legs 57, secured to the table 1. The track 56 is formed with an abrupt descent 58 and a similar ascent 59 close thereto, for effecting first a downward movement of the arms and jaws to dip the ice cream slice carried by the latter into a coating fluid in a suitable pan (Fig. 1), and to then immediately raise the arms and jaws to remove the dipped slice from the fluid. At another part of its circumference, the track 56 is provided with a descent 61, with an ascent 62 spaced rather far therefrom, and with a horizontal portion 63, between said descent and ascent. Along the portion 63 is an auxiliary track 64 which is in the downward path of the plunger shoe 54 as it drops with the arm 47, when roller 55 descends along the track descent 61. This track 64 thus effects an upward shifting of the plunger with respect to the arm to operate the links and levers above described, for the purpose of opening the jaw 40 and discharging the coated ice cream slice or pie onto the slide 33.

The general operation of the machine is as follows: Assuming that a slice of ice cream has just been cut by the cutter 10 and is moving on the conveyor 31 to the slide 32, one set of the arms 37 and 47 is then moving to the left in Fig. 1, toward said slide, and the jaw 40 is held open by contact of the shoe 54 with the track 64. By the time the slice descends along the slide 32, the jaws 39 and 40 are in readiness to receive it, and instantly upon such reception, shoe 54 leaves track 64 and spring 42 functions to close the jaw 40. The slide is thus held and carried to a point over the fluid pan 60, at which point, the arms descend to dip the slice and then immediately rise, due to the track formation 58—59. The arms and jaws now carry the coated slice until the descent 61 permits lowering of the arms and consequent release of jaw 40 under the influence of the track 64 and plunger shoe 54. When the jaw 40 is thus released, the finished product slides down the chute 33 onto the discharge belt 34 and is carried thereby from the machine.

It will be seen from the foregoing that very simple and effective means have been provided to carry out the objects of the invention, and on account of their advantages, the several mechanisms disclosed, are preferably followed, but attention is again directed to the fact that numerous modifications may be made.

Having thus described my invention what I claim is:

1. A machine of the class described comprising a conveyor to support an edible body, means for intermittently driving said conveyor to advance the body, a transverse cutter at the end of said conveyor and means for operating said cutter after each advancement of the block to cut a slice from the latter, a second and transverse conveyor for receiving the slices and delivering them at a predetermined point, and means movable by said point for receiving the slices from said second conveyor, dipping them in a coating fluid held in a pan and discharging the coated slices.

2. A machine of the class described comprising a rotary structure having a radial arm pivotally mounted solely for upward and downward movement, a jaw on the end of said arm rigid with respect thereto, a movable jaw co-operable with the stationary jaw and carried by said arm, a stationary cam co-operable with said rotary structure for effecting lowering of said arm to dip the jaws into a coating fluid held in a pan and raising of said arm from the fluid, and operating means for said movable jaw operable to close the same prior to descent of the arm and to open said movable jaw after raising of said arm.

3. A machine of the class described comprising a rotary structure having a radial arm pivotally mounted solely for upward and downward movement, a jaw on the end of said arm rigid with respect thereto, a movable jaw co-operable with the stationary jaw and carried by said arm, a stationary cam co-operable with said rotary structure for effecting an annular stationary cam co-operable with said rotary structure to effect dropping and raising of the arm at one point and similar movements of said arm at another point, operating means for said movable jaw active to close the same prior to the first dropping of said arm and including a vertically movable control member movable with the arm and operative when raised with respect to said arm for releasing the movable jaw, and a stationary track in the downward path of said control member adjacent the aforesaid other point, whereby to operate said control member to open the movable jaw.

4. A machine of the class described comprising a rotary structure having a radial arm pivotally mounted solely for upward and downward swinging, relatively movable spring closed jaws on the outer end of said arm, a lever fulcrumed on said arm and connected with at least one of said jaws to effect opening thereof, a second lever fulcrumed on said rotary structure under the aforesaid lever and linked thereto, a vertically movable plunger on said rotary structure associated with said second lever for operating the same, an annular stationary track co-operable with said rotary structure to effect lowering and raising of said arm at one point and similar movements of said arm at another point, and a stationary track in the downward path of said plunger adjacent said other point, whereby to move said plunger and effect opening of said jaws.

5. A machine of the class described comprising a rotary upright shaft, an inclined arm pivoted at its upper end to said shaft and carrying relatively movable jaws at its lower end, a second arm pivoted to the shaft and having a roller upon which the first named arm rests, said second named arm also having a transverse roller, an annular stationary track upon which the second roller rests, said track having cam means for effecting raising and lowering of the second arm, and operating means for the aforesaid jaws.

6. A machine of the class described comprising a rotary upright shaft, an inclined arm pivoted at its upper end to said shaft and carrying relatively movable jaws at its lower end, a second arm pivoted to the shaft and having a roller upon which the first named arm rests, said second named arm also having a transverse roller, an annular stationary track upon which the second roller rests, said track having cam means for effecting lowering and raising of the second arm at one point and similar movements thereof at another point, a vertically movable jaw-controlling member mounted on said second arm, connecting means between said controlling member and at least one of the aforesaid jaws, and a stationary track in the downward path of said controlling member adjacent the aforesaid other point for operating said member to open the jaws.

LOUIS A. SMITH.